(12) United States Patent
Bonderer et al.

(10) Patent No.: US 11,718,039 B2
(45) Date of Patent: Aug. 8, 2023

(54) STEREOLITHOGRAPHY APPARATUS WITH PERIODIC, TRANSVERSE MOVEMENT WITH AN AMPLITUDE OF .8 TO 15 MILLIMETERS

(71) Applicant: Ivoclar Vivadent AG, Schaan (LI)

(72) Inventors: Lorenz Josef Bonderer, Sargans (CH); Jörg Ebert, Buchs (CH); Theresa Sujata Maria Senti, Triesenberg (LI); Rudolf Jussel, Feldkirch-Gisingen (AT)

(73) Assignee: Ivoclar Vivadent AG, Schaan (LI)

( * ) Notice: Subject to any disclaimer, the term of this patent is extended or adjusted under 35 U.S.C. 154(b) by 1 day.

(21) Appl. No.: 17/167,207

(22) Filed: Feb. 4, 2021

(65) Prior Publication Data

US 2021/0252789 A1    Aug. 19, 2021

(30) Foreign Application Priority Data

Feb. 14, 2020   (EP) .................................... 20157407

(51) Int. Cl.
*B29C 64/393*    (2017.01)
*B33Y 10/00*    (2015.01)
*B33Y 30/00*    (2015.01)
*B33Y 50/02*    (2015.01)
(Continued)

(52) U.S. Cl.
CPC .......... *B29C 64/393* (2017.08); *B29C 64/124* (2017.08); *B29C 64/236* (2017.08); *B33Y 10/00* (2014.12); *B33Y 30/00* (2014.12); *B33Y 50/02* (2014.12)

(58) Field of Classification Search
None
See application file for complete search history.

(56) References Cited

U.S. PATENT DOCUMENTS 10,569,526 B2    2/2020   FrantzDale et al.
10,675,856 B2    6/2020   FrantzDale
10,814,360 B2*   10/2020  Pourcher ............... B29C 64/357
(Continued)

FOREIGN PATENT DOCUMENTS

CN    105946237 A  *  9/2016
CN    105946237 A     9/2016
(Continued)

*Primary Examiner* — Francisco W Tschen
*Assistant Examiner* — Guy F Mongelli
(74) *Attorney, Agent, or Firm* — Ann M. Knab; Thad McMurray

(57) ABSTRACT

A stereolithography apparatus having a build platform and a tray, into which the build platform can be immersed, wherein at the bottom in or on the tray a light-transmissive film is formed or arranged and is elastically deformable, having a light source or energy source underneath the film, the tray can be filled with flowable printing material, a control apparatus controls the movement of the build platform relative to the film and the control apparatus superimposes, during the substantially vertical release movement between a slice of a structure, produced by stereolithography, on the build platform from the film, upon the release movement a substantially horizontal, in particular translational, transverse movement which transverse movement extends at an angle between 60 and 120° relative to the release movement and has alternating, in particular reciprocating, movement directions.

17 Claims, 5 Drawing Sheets

(51) Int. Cl.
*B29C 64/124* (2017.01)
*B29C 64/236* (2017.01)

(56) References Cited

U.S. PATENT DOCUMENTS

| | | | | |
|---|---|---|---|---|
| 2001/0003874 A1* | 6/2001 | Gillette | ................ | B29B 13/065 |
| | | | | 34/169 |
| 2006/0022379 A1* | 2/2006 | Wicker | ................ | B33Y 70/00 |
| | | | | 264/401 |
| 2007/0299212 A1* | 12/2007 | Smillie | ................ | C08L 67/02 |
| | | | | 525/425 |
| 2012/0126454 A1* | 5/2012 | Simmons | ............. | C08G 63/916 |
| | | | | 525/419 |
| 2015/0096866 A1* | 4/2015 | Goater | ................ | B65G 25/08 |
| | | | | 198/407 |
| 2015/0196955 A1* | 7/2015 | Naftalin | ................ | B22F 5/006 |
| | | | | 264/401 |
| 2015/0231831 A1* | 8/2015 | El-Siblani | ............. | B33Y 30/00 |
| | | | | 425/150 |
| 2017/0297264 A1* | 10/2017 | Linnell | ................ | B33Y 30/00 |
| 2018/0124341 A1* | 5/2018 | Harding | ................ | B29C 64/214 |
| 2018/0297285 A1 | 10/2018 | Sheppard et al. | | |
| 2019/0176371 A1* | 6/2019 | Lee | ....................... | B29C 64/241 |
| 2020/0361147 A1 | 11/2020 | Beniya et al. | | |
| 2020/0368814 A1 | 11/2020 | Martin et al. | | |
| 2021/0023789 A1 | 1/2021 | Ng et al. | | |
| 2021/0024775 A1 | 1/2021 | Rolland et al. | | |

FOREIGN PATENT DOCUMENTS

| | | | |
|---|---|---|---|
| CN | 106012052 A | * | 10/2016 |
| CN | 107666999 A | * | 2/2018 |
| DE | 4125534 A1 | | 2/1993 |
| DE | 19929199 A1 | | 1/2001 |
| EP | 2011631 A1 | * | 1/2009 |
| WO | 2019130734 A1 | | 7/2019 |

* cited by examiner

1

STEREOLITHOGRAPHY APPARATUS WITH PERIODIC, TRANSVERSE MOVEMENT WITH AN AMPLITUDE OF .8 TO 15 MILLIMETERS

CROSS-REFERENCE TO RELATED APPLICATIONS

This application claims priority to European patent application No. 20157407.6 filed on Feb. 14, 2020, the disclosure of which is incorporated herein by reference in its entirety.

FIELD OF THE INVENTION

The invention relates to a stereolithography apparatus and to a method for operating a stereolithography apparatus.

BACKGROUND

Such stereolithography apparatuses have been known for a relatively long time. An example thereof is the solution known from DE 41 25 534 A1. In a manner known per se, the structure to be produced is built layer-by-layer with printing material and is cured by irradiation through a glass plate. If thorough curing of the layer is effected, the distance between the glass plate and the build platform must be increased in order to detach a film, located therebetween, from the attached structure.

US 20210024775, 20210023789, 20200368814, and 20200361147 relate to methods and devices for stereolithography and are hereby incorporated by reference in their entirety.

In the case of said stereolithography apparatus according to DE 41 25 534 A1, the build platform is arranged in a tray with printing material and is lowered in order to effect release of the film.

In order to facilitate the release, an additional shearing action is to be produced, i.e. a lateral movement of the build platform, in addition to the lowering movement.

This is to be produced by means of a rotation apparatus which rotates the entire build platform about a vertical axis.

This solution has not become established because in practice it was demonstrated to be the case that the film at the location was subjected to excessive tension and accordingly became torn.

Therefore, this concept was not pursued further for long.

As a consequence, stereolithography apparatuses were also used, in which during the detachment procedure the build platform moves downwards and then in this respect is arranged in the tray filled with printing material. For example, according to DE 199 29 199 A1 a transparent plate is used, to which a layer is applied, to which the printing material even in solidified form should not adhere.

However, detachment problems were and still are present.

In order to overcome such problems, a complicated separating force control has even been proposed, in which the tension in the film is to be measured in a complex manner in order to prevent the film from tearing.

However, these known solutions had the disadvantage that they either required a markedly slow detachment or lead to overloading of the film at specific points, which adversely affect at least the service life thereof.

Even if the detachment time per layer is only 10 s, the required process time in terms of e.g. 1000 layers, from which e.g. a structure can be produced, is considerable.

In spite of the use of particularly tear-resistant films, tear occurred repeatedly during more rapid detachment processes.

On the other hand, boundaries are set for the strength of the film because, on the one hand, said film must be transparent in order to facilitate light-exposure on the sites of the structure which are to be exposed to light, and, on the other hand, said film should not be too thick because it is essential for it to lie precisely and flatly against the glass plate to ensure accuracy in the provision of the details of the structure. Moreover, transmission losses caused by excessively thick films are to be avoided where possible.

SUMMARY

Therefore, it is the object of the invention to provide a stereolithography apparatus according to the claims and a method for operating a stereolithography apparatus according to the claims, which permits a comparatively rapid operation of the stereolithography apparatus without the durability and thus the service being adversely affected.

In accordance with the invention, this object is achieved by the independent claims. Advantageous developments are apparent from the dependent claims.

In accordance with the invention, provision is made that the stereolithography apparatus comprises a tray having a light-transmissive film.

The elastic film is connected to the tray on the edge-side and is held in a clamped manner at that location. In the non-tensioned state, it lies on the bottom of the tray. This is formed by a glass plate.

In the case of this solution, the build platform is introduced into the tray from above. The tray is filled with printing material and the build platform is immersed into the printing material.

In accordance with the invention, a control apparatus is provided which controls the movements of the build platform. On the one hand, a substantially vertical movement is controlled which comprises a placement movement, i.e. a movement from the top downwards, and a release movement, i.e. a movement from the bottom upwards, for releasing a produced structure from a film which is held at the bottom in the tray. On the other hand, a transverse movement which extends substantially perpendicularly to the placement movement and the release movement, i.e. horizontal in the case of the example is controlled.

The release movement is followed by a lifting movement, in which the build platform and the structure already created in part at this location is free from contact with the film and in which the build platform is moved further upwards.

This is referred to as a vertical release movement and also an additionally vertical movement. These movements can optionally also be effected in a slightly oblique manner at an angle of up to +/−20° to the vertical axis.

Said movements are to be understood to be relative movements. The transverse movement thus extends transversely relative to the placement movement and the release movement.

Preferably, the build platform is moved vertically or substantially vertically or in a vertical-like direction and the tray is moved transversely relative thereto, i.e. horizontally or substantially horizontally or in a horizontal-like direction. However, a kinematic reversal is fundamentally also possible. The term substantially is easily interpreted by one of ordinary skill in the art. "Substantially" herein may also be understood to one of ordinary skill in the art, to mean "close to" or it may include, but is not necessarily restricted to a range of 1 to 45 degrees or 2 to 35 degrees or 3 to 25 degrees or 4 to 15 degrees or 5-10 degrees and any amount in between.

The tray is filled with flowable printing material and the printing material is exposed to light in a manner known per se from the bottom through a glass plate in the base region of the tray and through the transparent film at the locations, at which the structure is to be formed.

The structure is formed layer-by-layer, in so-called slices. Each layer can be e.g. 0.02 to 0.15 mm thick, or e.g. 0.08 mm.

Each layer is produced in that light-curing of the printing material is effected by exposure to light by means of a strong light source at the corresponding locations which are to be exposed to light. The exposure to light solidifies the printing material at the desired location, while the printing material is in contact with the film and the preceding layer—or optionally the build platform.

In order to provide the next layer, the build platform together with the already completed structure must be raised so that further flowable printing material can pass onto the film and therefore the next layer can be produced by light-curing.

The film is elastic so that it can withstand tensions which occur. Surface effects mean that said film adheres to the layer just cured. Therefore, the release movement has a height which significantly exceeds the layer thickness. For example, the build platform can be raised by at least 5 mm in order to ensure that new printing material flows onto the film.

In accordance with the invention, the substantially vertical release movement of the build platform is superimposed and combined with a substantially horizontal transverse movement. In accordance with the invention, the transverse movement is configured with changing movement directions which in a particularly preferred manner are reciprocating and in particular are periodic.

Surprisingly, the reciprocating movement gives rise to a considerably improved detachment effect and thus a lower loading on the film. Said film can thus either be thinner, which permits more precise structures, or the durability of the film is considerably improved.

Moreover, a lower loading on the film permits the use of a thinner film. This provides considerable advantages:

The transmission properties are better, which leads to a shorter light-exposure time and thus to a more rapid process.

The scattering is small and so the accuracy of spatial resolution is improved.

The scattering intensity can be reduced, which can lead to a longer service life of the light sources used.

Tests have shown that the detachment suitability is almost doubled by the forward and rearward transverse movement, i.e. detachment is effected even with half the vertical release movement in comparison with a vertical release movement without any double-sided transverse movement.

This represents considerable progress because then the lowering movement also requires only half the height and therefore overall the output of the stereolithography apparatus can be almost doubled between the light-exposure windows. In this case, the lowering movement is to be understood to be the movement of the build platform during the lowering procedure, while the placement movement is to be understood to be the movement of said build platform to a target position. In this target position, the distance between the structure and the top of the film is 1 layer thickness, i.e. e.g. 0.08 mm and so the next layer can be exposed to light.

It is particularly favourable if the transverse movement is a type of swinging movement. This renders it possible—in this respect beyond a purely translational movement—to combine the sideward or sideways movement with an upward movement or downward movement.

This film is made in a manner known per se from a highly elastic material. When tension is removed, said film springs back and can be stretched to a great extent without tearing.

The teaching in accordance with the invention now permits transverse movements of the film in two directions which obviously greatly assist detachment.

In this case, it is necessary to take into consideration that the adhesion between the structure and the film exists merely in the boundary region between these two materials.

The film deforms over the thickness thereof to a greater extent as the distance from the structure increases. When the loading is removed, the film then contracts.

When viewed microscopically, the reciprocating movement produces, in the center region of the film, shearing movements relative to the structure, in this respect including inter alia also a shearing when the tension is removed from the film. This obviously also assists detachment.

In comparison with one-sided pulling, the two-sided movement in the transverse direction serves to double the transverse movement part.

In accordance with the invention, it is important that a transverse movement which includes the shear stress also includes a movement which reduces or nullifies the shear stress.

This is applied in the case of the forward and rearward transverse movements provided in one advantageous development.

When considering the transverse deflection, the forward transverse movement gives rise to an increase in shear stress and the rearward transverse movement to the movement center point gives rise to a decrease in shear stress. During further movement in the rearward direction, the shear stress then increases in the opposite direction and during the renewed forward transverse movement to the movement center point the counter-shear stress then decreases.

The combination of these 4 movement parts surprisingly results in a considerably improved detachment process.

The movement speed can be adapted in wide ranges to suit the requirements. It is also possible to adapt the transverse movement deflection and the other movement parameters to suit the structure to be produced at the location considered in each case. For instance, in the case of larger structures, i.e. structures in which there is a larger contact surface between the film and structure, the number of transverse movements can be increased and/or the frequency of the transverse movements can be increased.

Conversely, in the case of quite small structures, i.e. for instance at the beginning of the build process in the stereolithography apparatus, even quite small deflections can be sufficient, e.g. also only one forward transverse movement and one rearward transverse movement.

When considering the film and the structure as a connected formation, the separation is produced therebetween by reason of the alternating load at the predetermined breaking point, namely at the interface between the film and structure.

In an advantageous embodiment, the transverse movement begins with the release movement.

However, it is also possible to cause the transverse movement to begin before or after the release movement, e.g. at an interval of 0.5 s, 1 s or 2 s or up to 5 s in the case of larger structures.

Preferably, a plurality of transverse movements superimposes the release movement. This can be e.g. 1, 2, 3, 4 or else 10 or even 20 transverse movements. The amplitude of the transverse movement can likewise be adapted in wide ranges to suit the requirements and can be e.g. about 5 mm. The amplitude of the transverse movements may be in the range of 0.8 mm to 15 mm.

The release movement, i.e. the vertical movement of the build platform relative to the glass plate of the tray is preferably followed by a lifting movement. During the release movement, there is still at least minimal contact between the film and structure, whereas subsequently, i.e. during the lifting movement, there is no longer any contact.

The control apparatus in accordance with the invention controls all movements, i.e. the lifting movement, release movement and the transverse movements. It also has suitable sensors in order to be able to regulate the movements.

The control apparatus also controls the speed of the movements, namely the transverse movements and the release movement, in a particularly precise manner, e.g. in dependence upon the material used, the structure, the size of the structure and the material and the type of film.

However, the lifting movement is largely independent of the material and can be effected e.g. at maximum speed, likewise controlled by the control apparatus. This applies in particular to the time after the separation.

In a modified embodiment, provision is made that a forward transverse movement is superimposed upon a release movement and the rearward transverse movement is effected outside the time of the release movement.

In a further modified embodiment, provision is made that the control apparatus controls the movements such that each transverse movement ends before the release movement is completed.

In terms of speeds, the control apparatus can be adapted in wide ranges to suit the requirements. The control apparatus may control the release movement such that the vertical speed initially increases and shortly before the film is detached from the structure the speed decreases.

The transverse movement can be effected by a motor connected to a crank drive which moves in particular the tray and which produces the transverse movement based upon an output signal from the control apparatus, and provides a substantially sinusoidal speed profile.

The control apparatus controls, between the forward transverse movement and the rearward transverse movement, for compensating for the detachment inertia, an intermediate stop of the transverse movement, and in particular also between the rearward transverse movement and the forward transverse movement, wherein in particular both intermediate stops are substantially equal in length or differ in length by at most 20%.

In an advantageous embodiment, provision is made in this respect that an intermediate stop is provided at each end position of the transverse movement and that the transverse movements are controlled by the control apparatus such that the intermediate stops are shorter or longer than the movement periods.

For the practical implementation of the drives for the movements, a linear motor or a stepped motor having a gear rack is preferably provided for the vertical movement, i.e. the release movement and the lifting movement, and either likewise such a linear drive including the two options presented for the vertical drive or, for the sake of simplicity, a motor which is connected to a crank drive is preferably provided for the transverse movement.

The motor which runs at a constant speed produces by means of the crank drive a sine movement as the transverse movement.

In accordance with the invention, provision is made that the movements are effected between the build platform on the one hand and the tray on the other hand. The build platform supports the structure and the film is clamped on the tray.

BRIEF DESCRIPTION OF THE DRAWINGS

Further advantages, details and features will be apparent from the following description of several exemplified embodiments of the invention with reference to the drawings in which.

DETAILED DESCRIPTION

Figure 1:
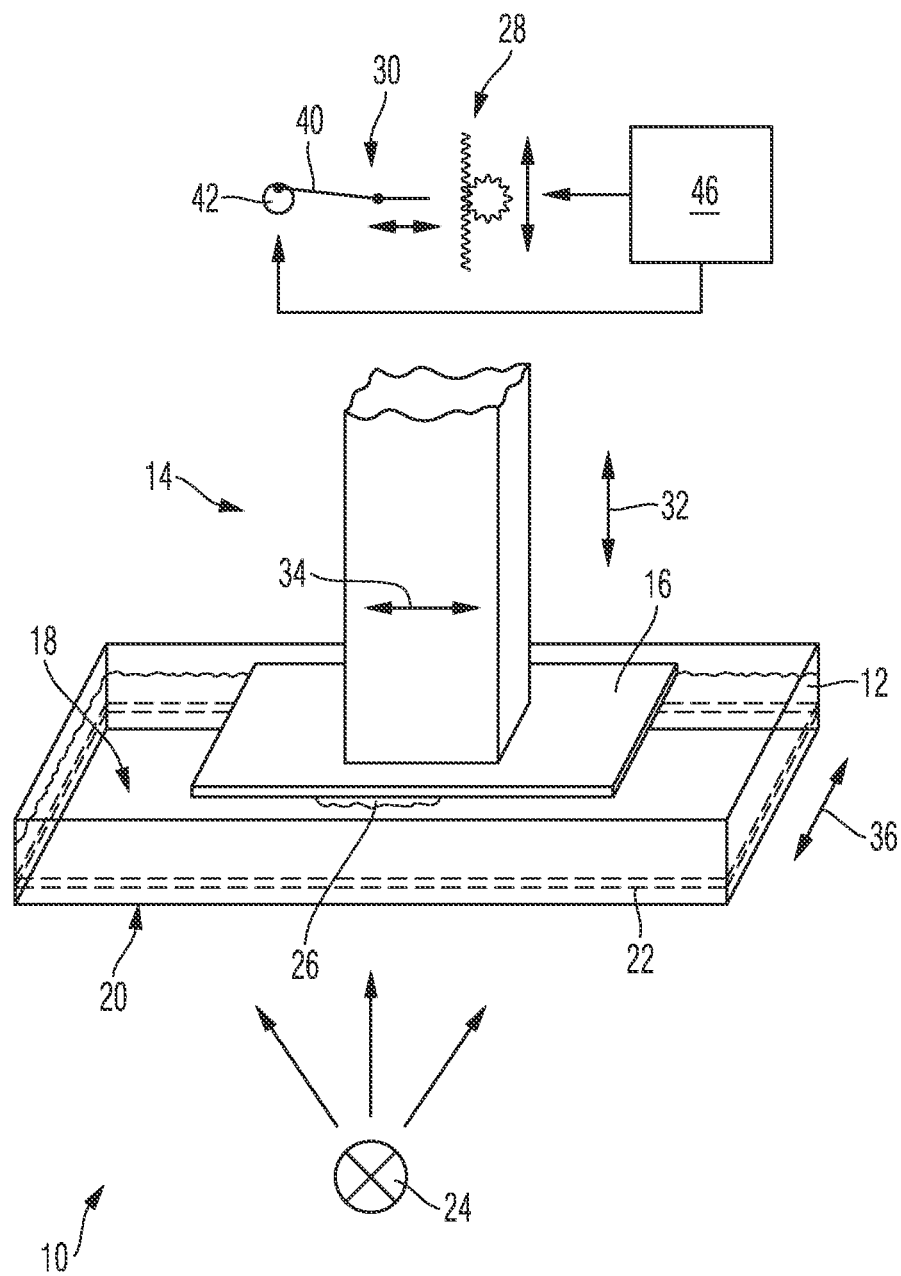
FIG. 1 shows a schematic perspective view of a stereolithography apparatus in accordance with the invention.

FIG. 1 shows a stereolithography apparatus 10 which basically has a structure which is known per se.

A tray 12 is provided, into which a build platform 14 can be lowered and immersed. At its lower end, the build platform 14 supports a build plate 16. The tray 12 is filled with printing material 18. The build plate 16 can be lowered into the bath of printing material 18.

On its underside, the tray 12 has a glass plate 20. The glass plate 20 extends below a film 22, which forms the base of the tray 12, either on the entire underside or at least on a large, preferably central part of the underside of the tray 12 and is transparent.

In this respect, the glass plate 20 is covered with the elastic and transparent, i.e. light-transmissive, film 22. The film 22 is held in a circumferentially clamped manner. For this purpose, a frame is provided which serves, likewise in a manner known per se, to fix the edge of the film 22 to the tray 12.

The film 22 is elastic and is fabricated of a transparent elastomer or another suitable material.

Provided below the glass plate 20 is a light source 24 which radiates upwards, i.e. towards the glass plate 20. The light source 24 can be e.g. a laser beam and a two-dimensionally movable deflecting apparatus, not illustrated, which deflects the laser beam to the desired location on the glass plate 20, can be provided.

At this location, the laser beam passes through the glass plate 20 and the film 22 and falls upon the printing material 18.

The printing material 18 is flowable and light-curable and so cures at the location at which it is exposed to light by the light source 24.

As an alternative to the combination of the laser with the deflecting apparatus described here, it is also possible to use a light source 24 which radiates over the entire surface and has a light-exposure control apparatus. This is supported at the bottom on the glass plate 20 and has pixels which can be operated to be black or transmissive in each case in a separately controllable manner. Alternatively, the light-exposure is effected via a DMD which is installed on the light source and the light radiation exiting at this location is projected directly or via tilted mirrors and optical elements in the light path onto the focal plane.

Such a light-exposure control apparatus, likewise not illustrated, can be used to expose a layer of printing material 18 to light according to the desired pixel arrangement and thus cure same in one go.

At the beginning of the build of a structure 26, i.e. at the beginning of the so-called build process, the build platform 14 lowered very far. The build plate 16 extends with its underside at a height of 0.08 mm above the film 22.

The first layer is then exposed to light. Such a layer is produced with a correspondingly selected layer thickness, such as e.g. 0.08 mm, and is also defined as a slice.

In order to produce the next layer thicknesses, on the one hand the film 22 must be released from the cured printing material 18, which is now present as the structure 26, from the structure 26 and on the other hand the build platform 14 must be raised so that new printing material 18 completely covers the film 22 and the next layer can be produced. The structure 26 is schematically illustrated in FIG. 1.

It is understood that any other layers are also possible, e.g. layer thicknesses between 0.03 mm and 0.8 mm or even above and beyond these values.

For the vertical movement of the build platform 14 which is connected to the build plate 16 and the structure 26 adhering at the bottom at this location, a lifting apparatus 28 is provided. Even if the lifting apparatus 28 schematically illustrated in FIG. 1 is designed for vertical movement, it is understood that instead of this a movement which is slightly oblique with respect to the vertical movement is also to be included in the wording "vertical", e.g. a movement which deviates by +/−20° from the vertical.

The vertical movement consists of a vertical release movement 32, during which the film 22 is released from the structure 26, and a lifting movement 50 which follows on therefrom in an upwards direction. During the lifting movement 50, the printing material 18 can flow more effectively into the region below the structure 26.

Depending upon the viscosity of the printing material 18, it is also possible to partially or completely omit the lifting movement 50, i.e. when the printing material 18 has a very low viscosity. In the case of a more viscous printing material 18, it is favourable to provide, for the lifting movement 50, 3 to 10 mm following the release movement 32.

In accordance with the invention, provision is made to produce a transverse drive 30 in addition to the lifting apparatus 28. The transverse drive 30 produces transverse movements 34 which are substantially horizontal, of the build platform 14 with respect to the tray 12. The transverse movements 34 extends preferably at a right angle to the release movement 32. However, it is also possible to make the angle between these movements deviate from 90 degrees, i.e. to maintain the angle e.g. in the range between 60 degrees and 120 degrees.

In this respect, since the tray 12 holds the film 22 in a clamped manner and the structure 26 adheres to the build platform 14, a substantially horizontal transverse movement 34 between the structure 26 and the elastic film 22 is also produced at the same time.

In the illustrated exemplified embodiment, the release movement 32 is vertical and the transverse movement 34 is horizontal. In this respect, both movements extend at an angle of 90° with respect to one another. However, it is also possible to cause the transverse movement 34 to extend at an oblique angle to the release movement 32. This can be between 80° and 100° or even between 60° and 120°.

The vertical axis is typically defined as the Z-axis and so the vertical movement which includes the release movement 32 can be considered to be a movement in the Z-direction. The direction which is horizontal in the plane of the drawing is typically defined as the X-direction, i.e. the corresponding movement as the movement in the X-direction.

The third spatial axis with respect to these two directions which extends in an oblique manner rearwards in the drawing shown in FIG. 1 is then the Y-direction 36, i.e. the movement in the direction of the Y-axis.

In the exemplified embodiment illustrated in this case, the transverse movement 34 is illustrated extending in the direction of the X-axis. However, it is equally possible to produce a transverse movement 34 in the Y-direction 36, or even a mixed form, i.e. the transverse movement 34 as a movement having a movement component in the X-direction and a movement component in the Y-direction 36.

In accordance with the invention, the transverse movement 34 is produced in such a way that it has alternating movement directions. This means that if in a first step a first transverse movement 54 extends in one direction, a second transverse movement 56 extends in another direction deviating therefrom. The second transverse movement 56 can differ from the first transverse movement 54 by any non-zero angle. The angle can be e.g. 90° but it can also be 180°.

In turn, the third transverse movement 58 has a movement direction which differs from that of the second transverse movement 56. The direction of the first transverse movement 54 and the third transverse movement 58 can differ from one another but they can also be the same.

In the second case, i.e. same movement between the first transverse movement 54 and second transverse movement 56, the transverse movement 34 is a reciprocating movement.

In the simplest case, the movement in the X-direction or in the Y-direction 36 is periodic. The transverse drive 30 which is illustrated schematically in FIG. 1 can then be designed as a crank drive having a crank 40. The crank 40 is driven in a manner known per se by a crank wheel 42 and so a sinusoidal transverse movement 34 is produced, provided that the crank wheel 42 is driven at a constant speed.

Any other forms of movement are possible instead of the simplest form of transverse movement 34 illustrated in this case. For example, the transverse drive 30 can be designed as a linear drive. The linear drive can be two-dimensional, i.e. in the X-direction and in the Y-direction 36.

Such a drive can be produced e.g. with a gear rack and a gear wheel. When viewed over the location, the movement can then be e.g. quadratic.

The transverse movement 34 can also take any other form in the X/Y-plane. For example, a triangular form or other polygonal form can also be achieved, or a polygon with rounded corners.

An elliptical form of the transverse movement 34 is also possible. This can be produced achieved e.g. with two mutually perpendicular crank drives, of which one crank 40 has a lesser deflection and the other crank has a greater deflection.

In accordance with the invention, it is important that the transverse movement 34 is not effected on one side but instead on two sides or multiple sides. Only then is the effect of the detachment of the structure 26 from the film 22 achieved. When the first separation, i.e. the beginning of the detachment, is effected depends greatly upon the circumstances of the individual case; e.g. it can be effected even at the beginning of the first movement or else after several reciprocating movements.

The transverse movement 34 can also be a type of swinging movement, i.e. a movement in which it has a vertical component in addition depending upon the deflection.

A control apparatus 46 controls the lifting apparatus 28 and the transverse drive 30, hence the release movement and the transverse movements, but also the light-exposure via the light source 24 and therefore the entire stereolithography apparatus 10.

Figure 2:
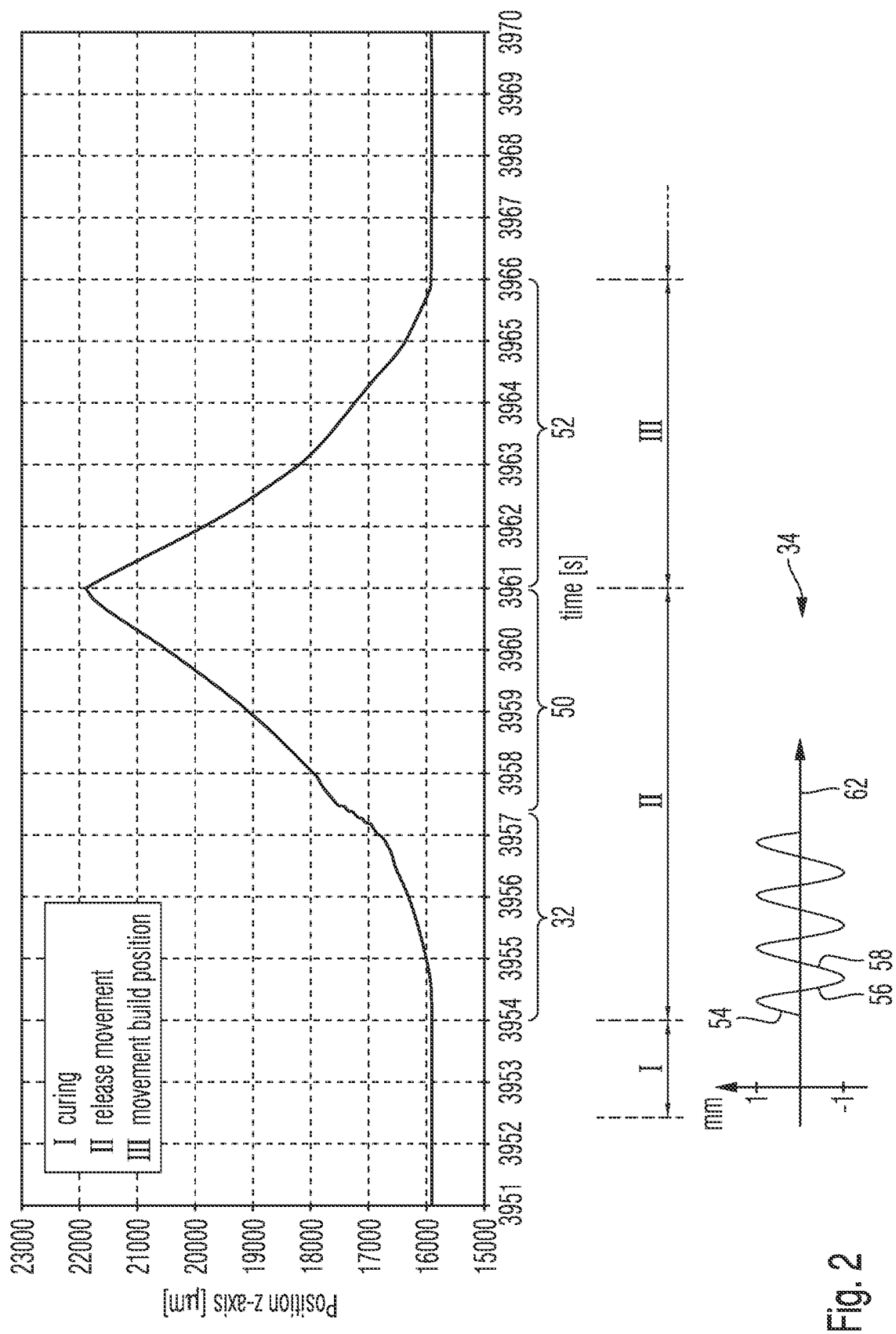
FIG. 2 shows a movement curve of the vertical movement and the transverse movement in one embodiment of the stereolithography apparatus in accordance with the invention.

A simple example of a transverse movement 34 in accordance with the invention is illustrated in FIG. 2. The upper graph in FIG. 2 illustrates the vertical movement or lifting movement which is composed of a release movement 32 and a lifting movement 50.

The graph shown FIG. 2 illustrates the vertical position of the build platform 14, i.e. the position in the direction of the Z-axis over time. The time segment discussed in this case comprises the time between 2 light-exposures.

The first light-exposure is designated by the time segment I and ends at 3954 s. The second time segment II is the release movement 32 and the lifting movement 50. The release movement 32 ends at about 3957.5 s and the duration of the lifting movement 50 is between the point in time 3957.5 s and the point in time 3961 s.

This is followed by the time segment III which shows the lowering movement 52. This lasts from 3961 to 3966 s. This is followed by a further light-exposure step, optionally with a rest period.

As can be seen, the first light-exposure is effected in the time segment I at a Z-position of considerably less than 16 mm and the second light-exposure II after the lowering movement 52 or the placement movement is effected at a Z-position of only slightly less than 16 mm. The difference corresponds to one layer thickness and is about 0.08 mm.

The transverse movement 34 in accordance with the invention is plotted under the graph and extends as a reciprocating movement. The transverse movement 34 begins at 3954 s. It starts with a first transverse movement 54 in the first ascending section of the illustrated sine curve.

The first transverse movement 54 is followed by an opposing second transverse movement 56 which extends beyond the zero crossing 62 of the transverse movement 34 and has a deflection in the negative direction, corresponding to the progression of a sine wave.

This is followed by a third transverse movement 58 which also proceeds from the negative deflection and then passes through the zero crossing 62 of the transverse movement 34 and then reaches the same maximum value in the positive direction as the first transverse movement 54.

In accordance with the invention, changes in the direction of movement of the transverse movement 34 are provided.

In the illustrated exemplified embodiment, seven changes in the direction of movement are provided during the release movement 32.

It is understood that in any event more than one change in the direction of movement, e.g. 2, 3 or more, are provided in accordance with the invention. For example, up to 20 changes in the direction of movement can also be provided, or even more.

Towards the end of the release movement 32, the detachment speed, i.e. the rapidity of the release movement 32 in the Z-direction, is increased slightly. In this state, the film 22 still has only very little contact with the structure 26 and so the holding forces are low.

Figure 3:
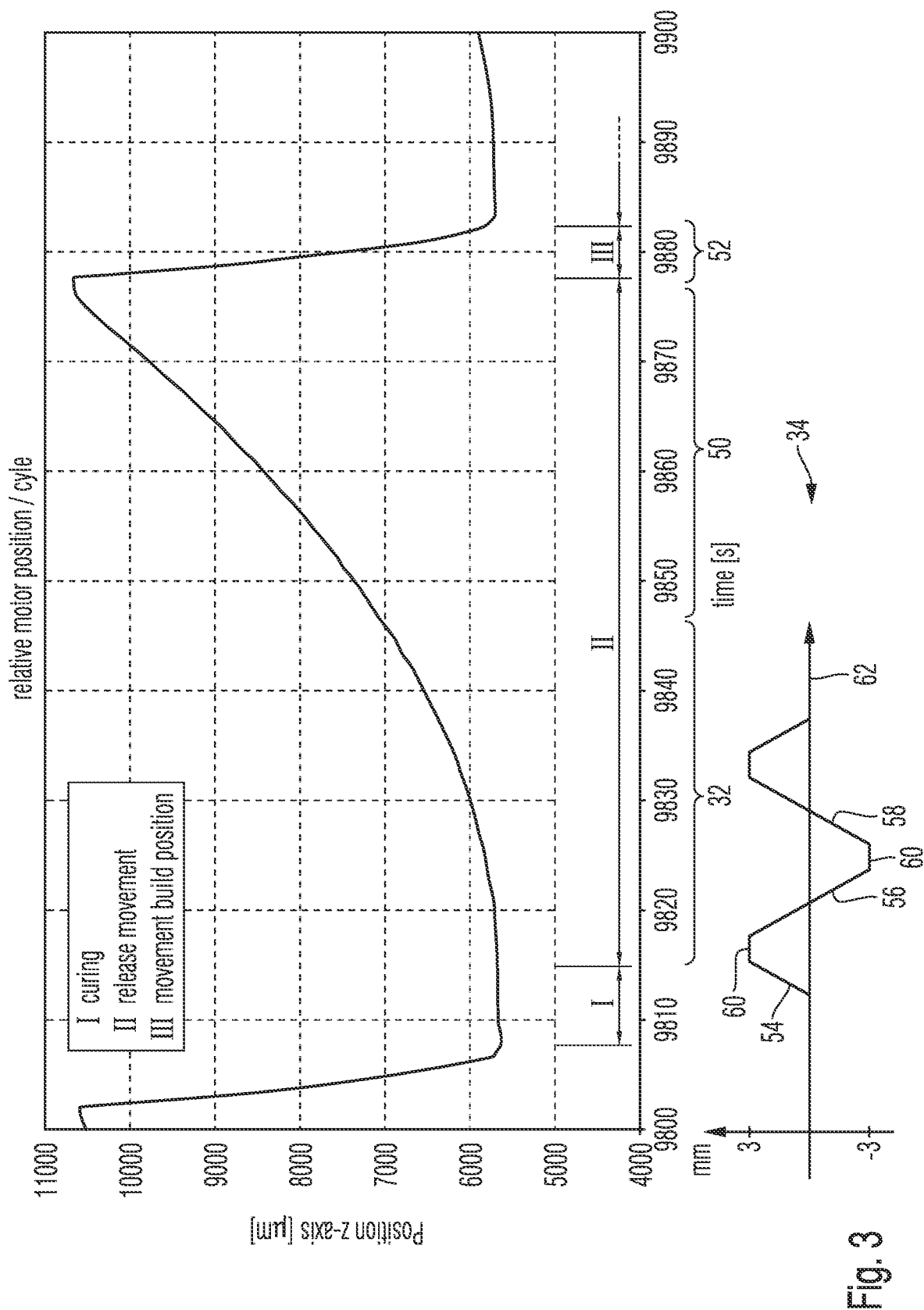
FIG. 3 shows a movement curve of the vertical movement and the transverse movement in another embodiment of the stereolithography apparatus in accordance with the invention.

FIG. 3 illustrates a control which is modified in comparison therewith. In this figure, as in the other figures, like reference numerals refer to like or corresponding parts and do not require further mention.

As can be seen in FIG. 3, in this embodiment the release movement 32 and the subsequent lifting movement 50 progress at increasing speed.

The transverse movement 34 has a substantially trapezoidal progression. Incorporated between the individual transverse movements 34 in each case is a short intermediate stop 60 which serves to relieve the film 22 of tension.

The intermediate stops 60 are provided in each case in the maximally deflected state and so in this state the film 22 is held under tension and becomes detached of its own accord.

It is understood that instead of this any other movement forms and movement times are possible without departing from the scope of the invention.

For example, the transverse movement 34 is accelerated in the region of the zero crossing 62 and is decelerated at maximum deflection 64 and 66, in a similar manner to the sine movement illustrated in FIG. 3 but also in any other form.

Figure 4:
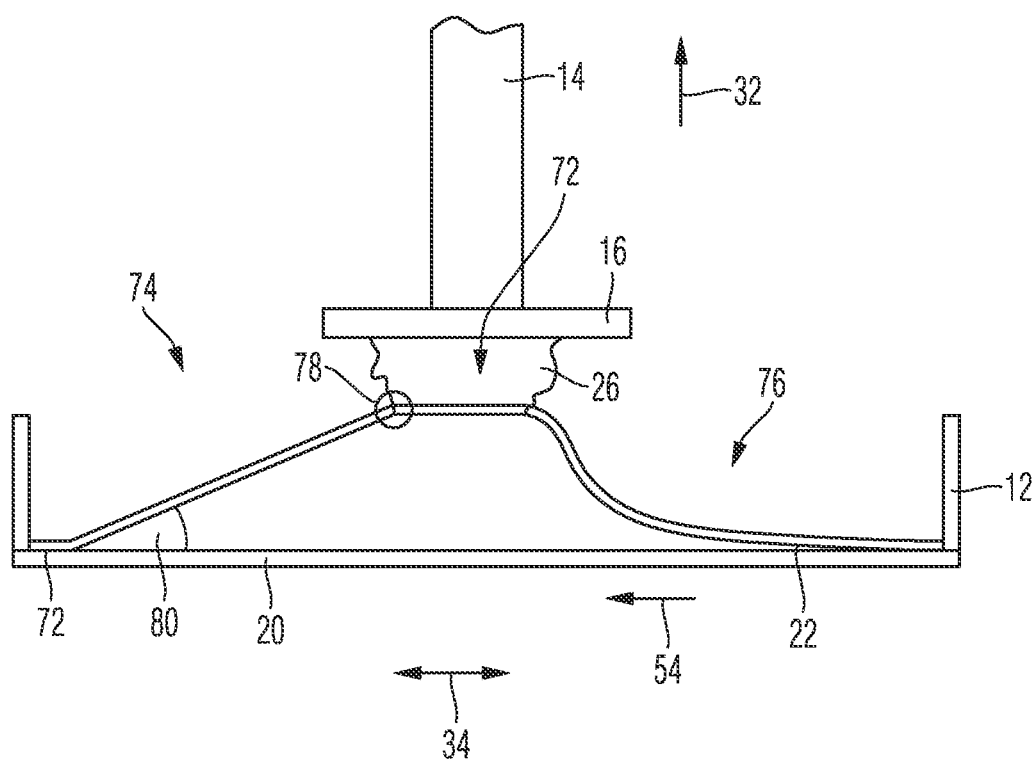
FIG. 4 shows a schematic view of the apparatus during release of the film from the structure.

FIG. 4 shows a further embodiment of the stereolithography apparatus in accordance with the invention. The build platform 14 has a vertical drive and the tray 12 has a horizontal drive. Accordingly, the transverse movement 34 is performed by the tray 12 and the vertical movement, i.e. for example the release movement, is performed by the build platform 14.

The build plate 16 of the build platform 14 supports the already completed structure 26.

In the state illustrated therein, the relevant layer of the structure 20 is already being exposed to light.

The film 22 is connected to the tray 12 on a frame 70 at the edges and lies in the non-tensioned state on the glass plate 20 which forms the base of the tray 12.

In this state, the film 22 is under slight tension as a result of being fixed to the frame 70.

If the release movement 32 is then introduced, a transverse movement 34 is superimposed thereon. In the illustrated exemplified embodiment, the moment of the completed forwards transverse movement 54 is illustrated. In this state, the tray 12 is displaced to the left, in relation to the illustration shown in FIG. 4. The film 22 still adheres in its centre region 72 to the structure 26. As a result, the left region 74 of the film 22 is put under tension, whereas the right region 76 becomes limp.

The tension in the region 74 ensures that the part of the centre region 72 extending furthest to the left is stretched. On the other hand, the structure 26 is considerably less elastic than the film 22. This results in a micro-displacement of parts of the film 22 at this location which is indicated in FIG. 4 by the reference numeral 78. This micro-stretching or relative movement in the transverse direction results in accordance with the invention in the beginning of the detachment procedure.

Superimposing the forward transverse movement 54 of the tray 12 with the vertical release movement 32 of the build platform 14 causes the film 22 to be tensioned and raised at the same time on one side, i.e. in the region 74. At the location 78, a shear force is introduced into the film 22 which, in terms of its orientation, is dependent upon the angle 80 indicated in FIG. 4. This shear angle 80 results from the oblique position of the region 74 shortly before the beginning of detachment.

The relevant angle can be e.g. between 0.1 and 20° and is 3° in the case of the example.

Figure 5:
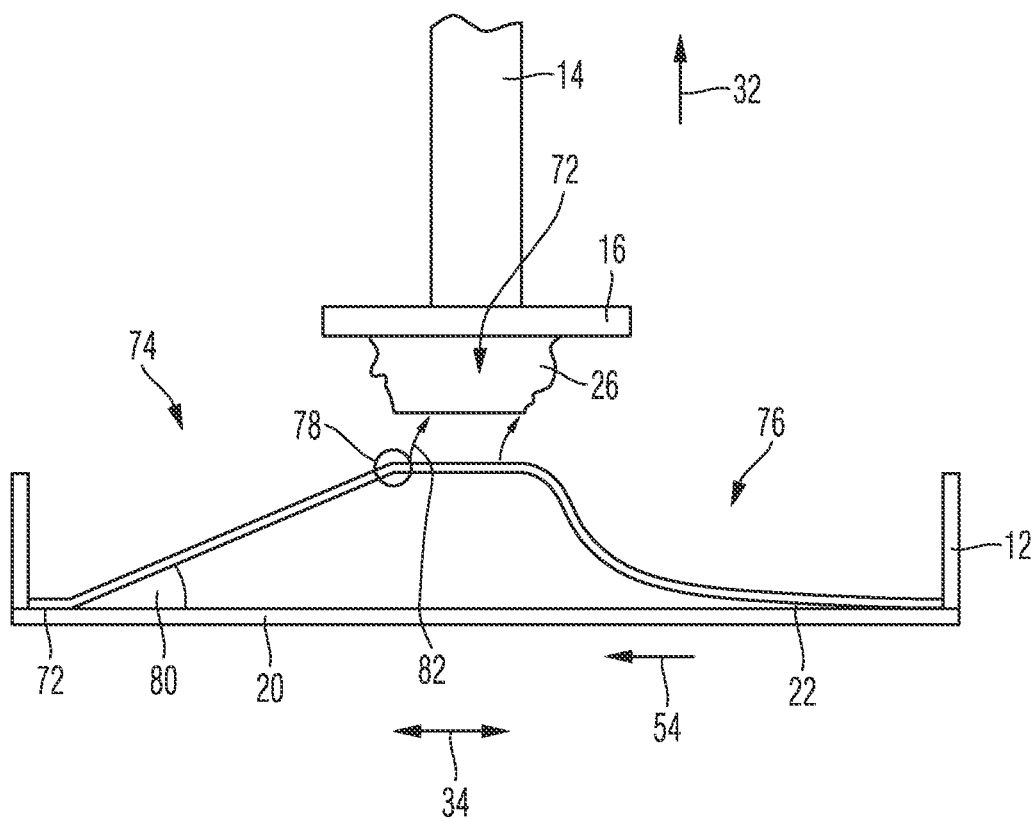
FIG. 5 shows a schematic view of a modified embodiment of the apparatus shortly after release of the film from the structure.

FIG. 5 shows a schematic view of the apparatus shortly after release of the film from the structure. At the point in time considered, the film 22 has just become released from the structure 26 and is in the process of moving in the direction of the non-tensioned state on the glass plate 20.

As can be seen in FIG. 5, the contact region between the film 22 and the structure 26 (cf. FIG. 4) has been moved to the left. In this embodiment, the transverse movement 34 progresses at a slightly oblique angle 82 of about 80 degrees to the release movement 32.

It is preferred that the build platform 14 and the tray 12 are orthogonal to one another. However, in the form of a modified embodiment in accordance with the invention, it is also possible in the individual case to deviate from the orthogonality in order to provide said oblique position angle, in that the lifting apparatus 28 is oriented obliquely but the tray 12 which is filled with liquid printing material remains horizontal.

In some embodiments the control apparatus may include any combination of hardware, software and/or processing circuitry suitable for controlling the various components of the lifting apparatus, build platform, light exposure and any other components in the system, described herein including, without limitation, general-purpose computer and/or dedicated computing device, including, but not limited to, microprocessors, microcontrollers, embedded microcontrollers, programmable digital signal processors or other programmable devices or processing circuitry, along with internal and/or external memory, application-specific integrated circuits, programmable gate arrays, programmable array logic components and any other digital and/or analog components, as well as combinations of the foregoing, along with inputs and outputs for transceiving control signals, drive signals, power signals, sensor signals, and the like.

In some embodiments, the components may include, or be connected in a communicating relationship with, a network interface, which may include any combination of hardware and software suitable for coupling the control and other components of the system to a remote computer in a communicating relationship through a data network. By way of example and not limitation, this may include electronics for a wired or wireless Ethernet connection, or any other short or long-range wireless networking components. This may include hardware for short range data communications such as Bluetooth or an infrared transceiver, which may be used to couple into a local area network that is, in turn, coupled to a data network such as the Internet. This may also, or instead, include hardware/software for a WiMAX connection or a cellular network connection (using, e.g., CDMA, GSM, LTE, or any other suitable protocol or combination of protocols).

The invention claimed is:

1. A stereolithography apparatus comprising
   a build platform,
   a tray, into which the build platform can be immersed, wherein at the bottom of the tray a light-transmissive film is formed or arranged which is elastically deformable,
   a light source or energy source underneath the film, wherein the tray can be filled with flowable printing material, and
   a control apparatus,
   wherein the control apparatus (46) controls the movement of the build platform (14) relative to the film (22),
   wherein the control apparatus (46) superimposes upon a substantially vertical release movement (32) between a slice of a structure (26), produced by stereolithography (10), on the build platform (34) from the film (22) a substantially horizontal movement (34) which movement (34) has alternating movement directions,
   wherein the substantially horizontal movement is a translational, transverse movement, and
   wherein the transverse movement (34) is configured as a relative movement between the build platform and the tray, which movement (34) extends at an angle between 60 and 120° relative to the release movement (32),
   wherein the release movement (32) is configured as a movement of the build platform (14) and the transverse movement (34) is configured as a movement of the tray (12), and
   wherein the transverse movement (34) is a periodic movement, having a movement amplitude in the range of 0.8 mm to 15 mm.

2. The stereolithography apparatus as claimed in claim 1, wherein the alternating movement directions comprise reciprocating movement directions.

3. The stereolithography apparatus as claimed in claim 1, wherein the control apparatus (46) controls the transverse movement (34) such that the transverse movement (34) begins with the release movement (32) with a deviation of 1 second or less.

4. The stereolithography apparatus as claimed in claim 1, wherein a plurality of transverse movements (34) superimposes the release movement (32).

5. The stereolithography apparatus as claimed in claim 4, wherein the plurality of transverse movements (34) comprise 2 to 10.

6. The stereolithography apparatus as claimed in claim 1, wherein, until the film (22) is detached from the structure (26), the release movement (32) is effected at a first speed, and, after detachment, is effected at a second speed which is equal to the first speed or is higher than the first speed.

7. The stereolithography apparatus as claimed in claim 6, wherein the first speed is a substantially constant speed.

8. The stereolithography apparatus as claimed in claim 1, wherein the transverse movement (34) includes a forward transverse movement and a rearwards transverse movement.

9. The stereolithography apparatus as claimed in claim 1, wherein the control apparatus (46) controls the release movement (32) such that the vertical speed initially increases and shortly before the film (22) is detached from the structure (26), the speed decreases.

10. The stereolithography apparatus as claimed in claim 1, wherein an amplitude of the release movement (32) differs by less than half from the amplitude of the transverse movement (34).

11. The stereolithography apparatus as claimed in claim 1, wherein, for the transverse movement (34), a motor is connected to a crank drive which moves the tray (12) and which produces the transverse movement (34) based upon an output signal from the control apparatus (46), and provides a substantially sinusoidal speed profile.

12. The stereolithography apparatus as claimed in claim 1, wherein the control apparatus (46) controls, between the forward transverse movement and the rearward transverse movement, for compensating for the detachment inertia, an intermediate stop (60) of the transverse movement (34), and also between the rearward transverse movement and the forward transverse movement, wherein both intermediate stops (60) are substantially equal in length or differ in length from each other by at most 20%.

13. The stereolithography apparatus as claimed in claim 1, wherein the duration of the release movement (32) is between 1 second and 30 seconds or about 4 seconds and the duration of a forward transverse movement is between 0.2 seconds and 8 seconds.

14. The stereolithography apparatus as claimed in claim 1, wherein the movement amplitude is about 5 mm.

15. The stereolithography apparatus as claimed in claim 5, wherein the plurality of transverse movements (34) comprise 3 or 4 movements.

16. The stereolithography apparatus as claimed in claim 13, wherein the duration of the release movement (32) is about 4 seconds and the duration of a forward transverse movement is about 1 second.

17. The stereolithography apparatus as claimed in claim 10, wherein an amplitude of the release movement (32) differs by less than ⅓ from the amplitude of the transverse movement (34).

* * * * *